US007979220B2

(12) United States Patent  
Scholtz et al.

(10) Patent No.: US 7,979,220 B2  
(45) Date of Patent: Jul. 12, 2011

(54) SYSTEM AND METHOD FOR MONITORING POWER DAMPING COMPLIANCE OF A POWER GENERATION UNIT

(75) Inventors: Ernst Scholtz, Raleigh, NC (US); Reynaldo F. Nuqui, Cary, NC (US)

(73) Assignee: ABB Research Ltd., Zurich (CH)

( * ) Notice: Subject to any disclaimer, the term of this patent is extended or adjusted under 35 U.S.C. 154(b) by 384 days.

(21) Appl. No.: 12/195,575

(22) Filed: Aug. 21, 2008

(65) Prior Publication Data

US 2010/0049455 A1  Feb. 25, 2010

(51) Int. Cl.  
*G01R 21/00* (2006.01)  
*G06F 17/40* (2006.01)

(52) U.S. Cl. ............... 702/60; 702/64; 702/65; 702/69; 702/75; 700/292; 700/293

(58) Field of Classification Search ............ 702/60, 702/61, 62, 64, 65, 69, 75  
See application file for complete search history.

(56) References Cited

U.S. PATENT DOCUMENTS

| | | | |
|---|---|---|---|
| 5,193,042 A * | 3/1993 | Espinoza et al. ............. 361/79 |
| 5,530,396 A * | 6/1996 | Vlatkovic et al. ............ 327/552 |
| 5,825,656 A * | 10/1998 | Moore et al. ................. 702/60 |
| 6,713,998 B2 | 3/2004 | Stanimirov et al. ........ 324/117 R |
| 7,149,637 B2 * | 12/2006 | Korba et al. ................... 702/60 |
| 7,203,622 B2 | 4/2007 | Pan et al. ..................... 702/184 |
| 7,272,515 B2 | 9/2007 | Peterson et al. ............... 702/59 |
| 2008/0140326 A1 * | 6/2008 | Scholtz et al. ................. 702/60 |
| 2008/0189061 A1 * | 8/2008 | Scholtz et al. ................. 702/65 |

OTHER PUBLICATIONS

E. Scholtz, M. Larsson and P. Korba, *Real-Time Parameter Estimation of Dynamic Power Systems using Multiple Observers*, IEE Power Tech Conference 2007, Lusanne, Switzerland, Jul. 2007.  
M. Saidy and F. M. Hughes, *Block Diagram Transfer Function Model Of A Generator Including Damper Windings*, IEE Proc.-Gener. Transm. Distrib., vol. 141, No. 6, Nov. 1994.

* cited by examiner

*Primary Examiner* — Hal D Wachsman  
(74) *Attorney, Agent, or Firm* — Renner Kenner Greive Bobak Taylor & Weber

(57) ABSTRACT

A system and method for monitoring the power damping compliance of a power generation unit comprises a measurement unit that is configured to be coupled to a power generation unit to identify the voltage, current, and frequency values associated with power output therefrom. A processing system maintaining a model-based filter processes the voltage, current, and, frequency values to estimate the total amount of damping provided by the power generation unit. The estimated total damping is compared to prior historical values maintained in a database using various statistical techniques to determine if a power system stabilizer (PSS) provided by the power generation unit is being operated in a manner complying with predetermined guidelines.

18 Claims, 2 Drawing Sheets

SYSTEM AND METHOD FOR MONITORING POWER DAMPING COMPLIANCE OF A POWER GENERATION UNIT

TECHNICAL FIELD

Generally, the present invention relates to electrical power generation and its subsequent transmission and distribution. More specifically, the present invention relates to a system that estimates the magnitude of electromechanical damping provided by a power generation unit. Particularly, the present invention relates to a system that estimates a current level of electromechanical damping maintained by a power generation unit for comparison with historical values using statistical analysis techniques.

BACKGROUND ART

A power generation unit generally consists of an electrical machine, such as a synchronous generator that is driven by a steam turbine, or other mechanical force-generating device, which is connected through a network of electrical transmission lines to various electrical loads that consume the generated power. To achieve such a result, a rotor maintained by the power generator is coupled to a rotating output shaft, or prime mover, that is driven by the steam turbine, resulting in the generation of electrical power. The generated power is delivered to a power transmission and distribution network, hereinafter referred to as a power delivery network, which supplies the generated power to various electrical loads. Thus, an integrated power system which combines the power generation unit with that of a transmission network, forms an electromechanical system, whereby the electromechanical oscillations that develop during the conversion of the mechanical energy supplied by the turbine into electrical power output by the generator are characterized by Newton's second law of motion in rotational form. As such, the power generation unit, which includes the power generator that performs the electromechanical conversion of the input mechanical power from a turbine shaft driving the rotor of the generator, is characterized by an inertia (mass) that is attributed to the generator's rotor, while the power delivery network can be viewed as a nonlinear spring. Thus, any mismatch between the mechanical power supplied by the prime mover to the generator, and the electrical power supplied by the power generator to the power delivery network results in the variable increase or decrease in the rotational speed of the prime mover. Such variability in the rotation of the prime mover is also characterized as electromechanical disturbances, or power oscillations that propagate throughout the integrated power system that includes the power generation unit and the power delivery network.

In general, electromechanical disturbances or oscillations imparted to power systems tend to degrade the overall quality of power supplied by the power generation system, and oftentimes compromises stability and reliability of the generation unit and the delivery network. Such oscillations also contribute to the unnecessary degradation of associated equipment and components that form the power generation unit and delivery network. Additionally, the oscillations may result in disruptive generator tripping, causing power outages, which are performed to protect the expensive components of the generator from exposure to the oscillations. To limit or reduce such oscillations, the integrated power system that incorporates the power generator and the delivery network has an inherent or natural damping characteristic associated with the physical electromechanical phenomena of the system. The degree of natural damping depends primarily on the particular manner of power generation, the electrical characteristics of the loads being powered, as well as the relative geographical position of the power generation system and associated loads. However, the degree of natural electromechanical damping is generally minimal for such an integrated power system, and thus in order to achieve acceptable damping performance that provides a suitable level of stabilization throughout the integrated power system, separate control systems, such as power system stabilizers (PSS), are installed to contribute additional levels of electromechanical damping to the power generator. In other words, supplemental control systems, in the form of power system stabilizers (PSS), are needed to ensure prompt elimination of oscillatory disturbances that are created by the power generation system, so as to prevent the degradation of the components of the power distribution and transmission system. Therefore, most transmission operators that oversee or manage the operation of the delivery network require installation of power system stabilizers (PSS) at the power generating units to improve the operational stability of the integrated power system to prevent the occurrence of such oscillatory events.

In particular, power system stabilizers (PSS) comprise a feedback controller that may be realized in software, hardware, or a combination of both, which provides a control input to an actuator maintained by the power generator. For example, in the case of a synchronous power generation unit, the actuator to which the control input is supplied comprises an automatic voltage regulator (AVR) and a field circuit that is associated with the power generator. By providing the appropriate control input to the AVR due to the operation of the PSS, the appropriate amount of damping is supplied in phase with the speed of the rotor of the power generator via the field circuit. And thus, the PSS is able to maintain suitable system stability before damage to the power generation unit or delivery network occurs.

Furthermore, the operation of the integrated power system to maximize power generation and transmission capacities, as well as the development of alternative techniques of power generation also creates conditions that are conducive for the generation of electromechanical oscillations. For example, next generation power generators are being designed with lower H-factors (megawatts per-unit megavolt-amp) to achieve more efficient operation, while the development of non-conventional energy generation methods, such as wind power generation, contribute to the increasing frequency and severity of such electromechanical oscillations. In addition, operating strategies to increase the use of existing power generation networks subjects such systems to more stress, and thus increases the frequency in which such systems are exposed to electromechanical oscillations that result after a fault condition in the electric delivery network has been encountered.

Thus, due to the continued growth in power consumption, power systems are likely to continue to be operated in a manner to maximize their power transmission throughput. Furthermore, new generator design reduces the stored kinetic energy maintained in the power generators and the associated turbines that drive them, thus resulting in more severe electromechanical oscillations. While, the unpredictable nature of the electromechanical outputs provided by alternative power generation systems, such as wind power, makes the management of electromechanical oscillations generated thereby a significant challenge.

In addition to the challenges in managing such electromechanical oscillations, the manner in which such oscillations are monitored and reported also present obstacles to those responsible for ensuring the integrity and stability of the power delivery network. For example, power generation utilities that manage the operation of the power generation unit, and power delivery utilities that manage the operation of the power delivery network typically comprise separate, unrelated entities that may have disparate operating agendas and protocols. As such, power delivery utilities rely on the operators of the power generation systems or power generation utilities to provide adequate electromechanical damping to the power generation systems, via the power system stabilizers (PSS) to prevent the degradation of the various components of the power delivery network, as well as to preserve or otherwise maintain the stability and integrity of the power delivery network. Unfortunately, due to the nature of the industry, power generation utilities often disable the power system stabilizers (PSS) that supply damping to the power generation systems. For example, the power system stabilizers (PSS) may be deactivated by the power generation utilities due to poor controller parameter design and settings. Alternatively, operators of the power generation systems may perform ad-hoc tuning of the PSS to find its gain, which may then be kept fixed for all operating points or power generation output levels or magnitudes. Thus, the chosen gains may cause the overall power generation and delivery system to be unstable when the generation system is operated at a power output level that is not complemented by appropriate levels of damping or may result in the decrease in the damping of the overall system, which makes the system more susceptible to electromechanical oscillations.

Furthermore, the power system stabilizers (PSS) may simply be disabled by those overseeing the operation of the power generation utilities due to poor tuning of the PSS. This may result in the generator oscillating against the power delivery system during what is thought to be "normal" operation of the power generators, which according to industry reports has occurred worldwide, including in India and Mexico. Unfortunately, the system operator or other supervising entity responsible for overseeing the operation of the power delivery utility has limited means to identify whether the power generating units are providing suitable levels of damping to effectively contribute to the dynamic stability of the power delivery system.

In addition to providing the appropriate amount of damping to the power generation system via the PSS, power generation utilities are required to report their PSS operation to various supervisory and regulatory bodies, such as the North American Electric Reliability Corporation (NERC), on a periodic basis to confirm their compliance with damping guidelines. In one implementation of the reporting process, power generation utilities with power system stabilizer (PSS) functionality are required to report the operating hours of the PSS on a quarterly basis, while hours of operation without PSS operation are required to be annotated with sufficient information regarding PSS outage, excitation system outage, generator maintenance, and the like.

Unfortunately however, a major drawback to such reporting efforts is that PSS reports themselves are susceptible to being readily altered, as there is generally no mechanism to verify the accuracy of the data contained in the report. Although, off-line PSS compliance monitoring systems, or systems whereby compliance is assessed during an analysis that is subsequent to the occurrence of an adverse oscillation, are available for use to determine accurate reporting of PSS operation is taking place, such monitoring systems are only triggered by large and/or irregular system disturbances, such as an electrical fault or change in the magnitude or other attribute of the loads being powered. Furthermore, such off-line analysis is time-consuming, and due to the nature of the operation of power delivery networks, is typically initiated after a significant amount of time, such as several weeks for example. Thus, such post-disturbance PSS analysis does not provide a proactive system that enables quick response to non-complying PSS operation, which would contribute to the improvement in power generation and delivery stability. Additionally, even after such post-disturbance PSS compliance analysis is performed by the power generating utility, the power delivery utility must rely on the premise that the power generating utility is reporting the results of its compliance analysis accurately.

Therefore, there is a need for a system to collect on-line (real-time) and/or off-line data to determine whether the power system stabilizers (PSS) maintained by a power generation unit are being operated in accordance with specific guidelines for electromechanical damping. Additionally, there is a need for a system that allows an individual to benchmark the actual and historical electromechanical damping values for subsequent comparison using statistical techniques. Furthermore, there is a need for an independent or autonomous system that is configured to be electrically coupled to a power delivery bus to collect on-line and/or off-line electromechanical damping data associated with a power generation unit.

SUMMARY OF INVENTION

In light of the foregoing, it is a first aspect of the present invention to provide a system for monitoring electromechanical damping compliance of power generated by a power generation unit for supply to a power delivery network, the system comprising a measurement unit adapted to be coupled to the delivery network, the measurement unit configured to identify the voltage and current values output by the power generation unit, a database adapted to maintain at least one prior power damping value associated with the operation of the power generation unit, and a processing system coupled to the measurement unit and the database, the processing system maintaining at least one filter configured to estimate a power damping value associated with the power output by the power generation unit based on the identified voltage and current values, wherein the processing system compares the estimated power damping value with the at least one previous power damping value to determine if the estimated power damping value varies from the at least one prior power damping value.

It is another aspect of the present invention to provide a system for monitoring electromechanical damping compliance of power generated by a power generation unit for supply to a power delivery network, the system comprising a measurement unit adapted to be coupled to the power delivery network, the measurement unit configured to identify the operating frequency associated with the power generated by the power generation unit, a database adapted to maintain at least one previous power damping value associated with the operation of the power generation unit, and a processing system coupled to the measurement unit and the database, the processing system maintaining at least one filter configured to estimate a power damping value associated with the power output by the power generation unit based on the operating frequency identified by the measurement unit, wherein the processing system compares the estimated power damping value with the at least one previous power damping value to determine if the estimated power damping value varies from the at least one previous power damping value.

Yet another aspect of the present invention is to provide a method for monitoring electromechanical damping compliance of a power generation unit configured to distribute power to a delivery bus, the method comprising, providing a measurement unit configured to measure the operating frequency of the power generation unit, providing a database of at least one previous damping value associated with the measurement unit, coupling the power measurement unit to the delivery network, measuring the operating frequency of the power generation unit, estimating a damping value associated with the power output by the power generation unit based on the operating frequency of the power generation unit, and comparing the estimated power damping value with the at least one previous power damping value.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
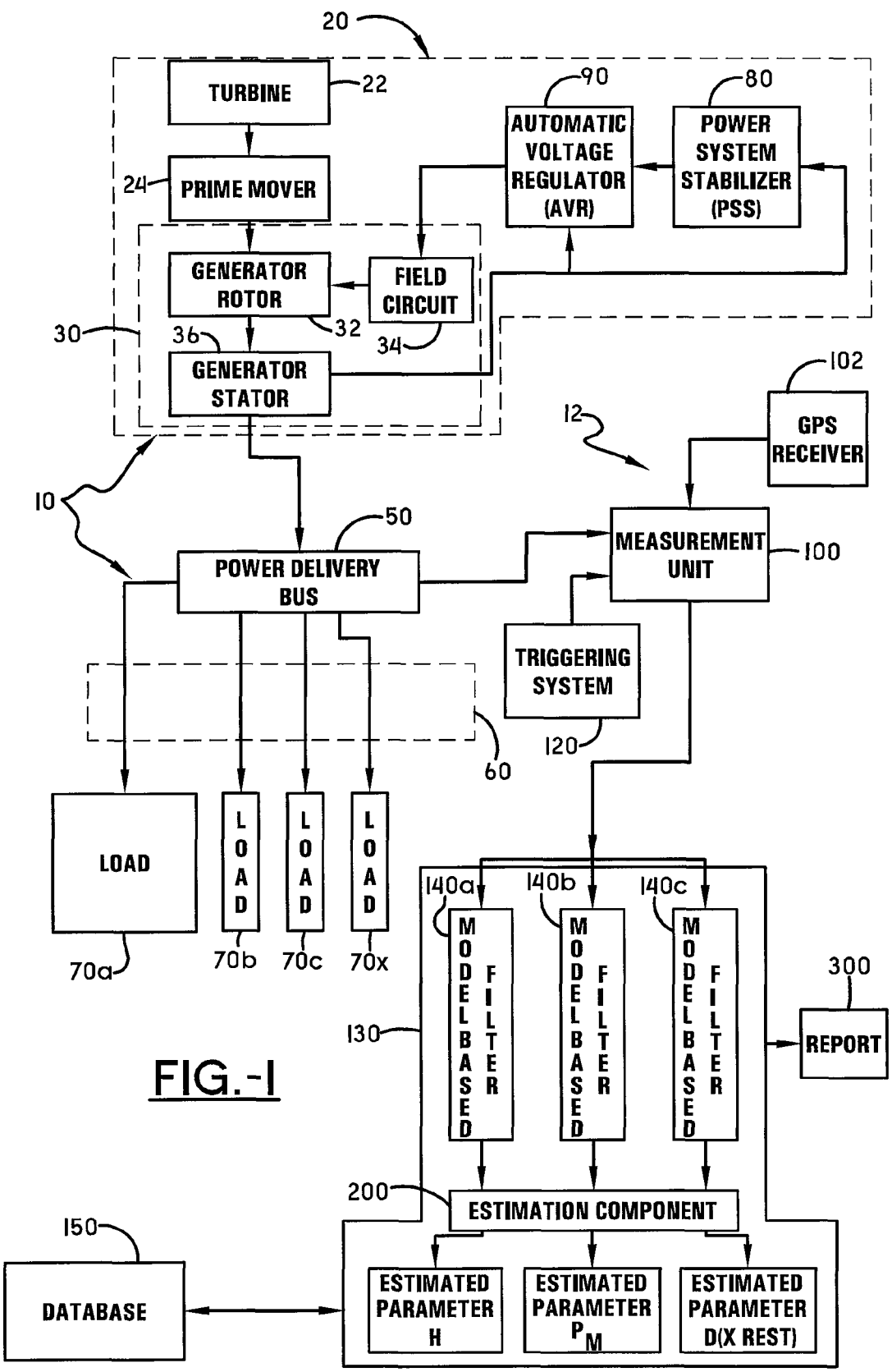
FIG. 1 is a block diagram showing a system for monitoring power damping compliance of a power generation unit in accordance with the concepts of the present invention.

A system to monitor electromechanical damping compliance of a power generation system 10 is generally referred to by the numeral 12, as shown in FIG. 1 of the drawings. However, prior to discussing the components of the damping compliance monitor 12, a brief discussion of the power generation system 10 will be presented, as it will assist the reader in understanding the operation of the damping compliance monitor 12.

In particular, the power generation system 10 comprises a power generation unit 20 that includes a turbine 22, such as a steam turbine, or other device that drives a rotating prime mover 24. The prime mover 24 is coupled to a power generator 30 via a rotating generator rotor 32, which is operatively associated with a field circuit 34 and a generator stator 36, such that when the rotor 32 is rotated electrical power is output by the power generator 30. The generated electrical power is then supplied to a delivery bus 50 for delivery via a power delivery network 60 to any number of various loads 70a, b, c . . . x. That is, the rotating mechanical movement of the prime mover 24 is converted into electrical power by the power generator 30, whereupon it is delivered to the loads 70 connected thereto via the delivery network 60. As such, due to the nature of the power generation unit 20, there are instances where the input to the power generator 30 delivered by the prime mover 24 does not match the power output by the generator 30 for supply to the power delivery network 60 and the attached loads 70. As a result of this imbalance between the power delivered to the power generator 30 and the power needed by the power delivery network 60, the speed of the prime mover 24 may fluctuate in an attempt by the turbine 22 to precisely match the power requirements of the power delivery network 60 and the attached loads 70. However, to prevent these fluctuations in the rotational speed of the prime mover 24 from developing into electromechanical oscillations that may result in damage or instability at the power generator 30 and the power delivery network 60, a power system stabilizer (PSS) 80 is coupled to the power generator 30. Furthermore, the speed output of the prime mover 24 may remain constant due to the time-scale used to monitor its operation. And as such, an additional control input may be used to modify the output of the prime mover 24 on a slower time-scale in order to damp any electromagnetic oscillations generated thereby.

The PSS 80 is configured to monitor the speed of the rotor 32 and to provide a feedback signal thereto, so as to maintain the speed at a constant or nearly constant level. In particular, to complete a feedback loop, the power system stabilizer (PSS) 80 is coupled to the field circuit 34 of the power generator 30 via an automatic voltage regulator (AVR) 90. The AVR 90 is configured to monitor the voltage output by the power generator and to control the power generator 30 via the field circuit 34, so as to maintain a constant or nearly constant reference voltage. As such, during operation of the power generation system 10, the PSS 80 monitors the speed of the rotor 32, and in the event of a change in speed, supplies a suitable control signal to the AVR 90. As a result, the AVR 90 then applies suitable feedback signals to the field circuit 34, so as to either increase or decrease the amount of electromechanical damping applied in phase with the speed of the rotor 32 of the power generator 30, thereby adjusting its speed so as to maintain the reference voltage output by the power generator 30. As such, the consistent operation of the power system stabilizers (PSS) 80 are vital to maintaining the stability throughout the power generation system 10, particularly the power delivery system 60. As such, the goal of the compliance monitoring system 12 is to provide a tool in which a determination can be made as to whether the PSS 80 is providing levels of damping that are in compliance with operating guidelines, without directly accessing the particular PSS 80 itself.

With the components of the power generation system 10 set forth, the details of the compliance monitoring system 12 will now be presented. Specifically, the damping compliance monitoring system 12 includes a measurement unit 100, such as a phasor measurement unit (PMU) or other power quality (PQ) meter or monitor that is coupled to the power delivery bus 50, although the measurement unit 100 may be coupled to any desired point or node on the power delivery network 60. Thus, the compliance monitoring system 12 enables power distribution or delivery utilities that manage the power delivery bus 50 and delivery system 60 to remotely monitor the damping levels provided by the PSS 80 and the other components of the power generation unit 30, without physically accessing the power generation unit 30, which are under control of the power generation utility. Specifically, the measurement unit 100 may be implemented in hardware, software, or a combination of both, and is configured to measure the analog voltage and current supplied by the power generator 30 to the delivery bus 50. In one aspect, the measurement unit 100 is configured to generate digital samples of the voltage and current waveforms at the Nyquist sampling rate, so as to adequately monitor the electromechanical dynamics evident in the voltage and current waveforms. In addition, the operating frequency of the power generator 30 may also be derived from these voltage and current measurements to facilitate the operation of the monitoring system 12 in the manner to be discussed. That is, the measurement unit 100 is able to calculate the phasor of the predominant sinusoidal voltage and the current signal output by the power generator 30 in relation to universal timing coordinates or measurements. Optionally, a GPS (global positioning system) receiver 102 may be coupled to the measurement unit 100 if the measurement unit 100 is not enabled to provide timing measurements, although other devices that provide timing measurements could be used. Furthermore, because the entity, such as a power delivery utility, that oversees the operation of the power delivery network 60 is typically unable to access the power generation unit 20 directly, the monitoring system 12 is configured so that the total damping of the power generation unit 20 can be estimated indirectly via voltage and current values measured at the measuring unit 100 in a manner to be discussed.

A triggering system 120 is coupled to the measurement unit 100 to selectively enable the operation of the measurement unit 100, as well as the monitoring features of the compliance monitoring system 12. In one aspect, the triggering system 120 comprises the software realization of an algorithm, which is suitable for execution on any general-purpose or application-specific processing device that is suitable for detecting the presence of electromechanical oscillations in the power generation system 10. Specifically, the triggering system 120 via the measurement unit 100 analyzes the measured signal content of the power output during such an oscillation to determine if the power generator 30 is being persistently excited, which implies that there is sufficient information in the analyzed signal to perform a parameter estimation analysis to identify the amount of damping being provided by the power generation unit 20. In another aspect, the triggering system 120 may be configured as a hardware implementation, whereby the triggering signal may be a binary signal communicated to the measurement unit 100 in order to initiate the recording of current and voltage signals that are measured by the measurement unit 100. In yet another aspect, the triggering system 120 may be maintained and/or integrated with the components of the measurement unit 100, and thus require computer software to initiate the triggering process. Furthermore, the triggering system 120 may comprise a collection of sensors, local or remote, that transmit indications of change in the status of the power system equipment, including the power generation unit 12, which may include circuit breakers or disconnect switches for example.

The compliance monitoring system 12 also includes a processing system 130 that maintains a plurality of model-based filters or observers 140a, 140b, and 140c that are implemented via suitable software, and which are configured to operate in parallel to estimate various parameters of a mathematical model representing the power generator 30. Such a system is beneficial in that the compliance monitoring system 12 enables the estimation of the total or aggregate electromechanical damping levels provided by the interaction of the power generation unit 20 with the power delivery network 60, which includes the natural damping of the power generator 30 and the damping contributed by the power system stabilizer (PSS) 80. In one aspect, the processing system 130 may comprise any suitable general-purpose or application-specific processing system suitable for carrying out the operation of the model-based filters and various other functions performed by the compliance monitoring system 12 to be discussed. For example, the observers or model-based filters 140a-c may be realized in the form of a Kalman filter, although any other suitable model-based filter may be utilized. In addition, each of the observers 140 is coupled in a parallel orientation, such that they may be executed on individual microprocessors or independent threads on the same microprocessor. In one aspect, the processing system 130 may estimate the total or aggregate damping parameter using the generator model that is implemented using a method whereby parameters are estimated using multiple parallel observers, such as the method set forth in the publication entitled "Real-time Parameter Estimation of Dynamic Power Systems using Multiple Observers," published in the proceedings of the IEEE Power Tech Conference held in Lausanne, Switzerland, July 2007, the contents of which is incorporated herein by reference. As such, the model-based filters enable the estimation of various physical operating dependent parameters including, but not limited to the aggregate or total amount of damping provided by the power generation unit 20, the inertia of the rotor 32 maintained by the power generator 30, and the mechanical power that is supplied by the prime mover 24 from the turbine 22. Coupled to the processing system 130 is a database 150 that is configured to store or maintain historical values of prior total or aggregate damping values estimated by the compliance system 12. The database 150 may comprise any suitable system that is configured to archive the collected damping values for subsequent analysis via the processing system 130 or other device to determine whether estimated damping levels are in compliance with predetermined guidelines using various statistical methods to be discussed. The monitoring system 10 may be implemented as an on-line software algorithm that monitors in real-time (or in near real-time), or may be realized as an off-line system that can be used for post analysis after an electromechanical oscillation has occurred, whereby the sampled voltage and current waveforms are stored at the database 150 for post processing.

The processing system 130 identifies the voltage and current values output by the generator 30 via the measurement unit 100, whereupon the model-based filters 140a-c implements a mathematical model defined by $$2H\,dw/dt = (P_m - P_{elec}) - D(x_{rest})(w - ws) \tag{1}$$

that characterizes the operation of the synchronous generator 30. In particular, the variable H defines the inertia of the power generator 30, $P_m$ is defined as the mechanical power that is delivered by the prime mover 24 to the rotor 32 of the power generator 30; $P_{elec}$ is defined as the electrical power that is output by the power generator 30; $D(x_{rest})$ is defined as the total amount of mechanical damping that is provided by the power generation unit 20, which includes the inherent damping of the open-loop electromechanical system (i.e., the damping provided by the power generator 30 plus its interactions with the delivery network 60 and loads 70) and the supplemental damping provided by the PSS 80; and $(w-w_s)$ which is defined as the difference in frequency (in radians/second) between the speed of the generator 30 and the synchronous frequency (e.g. 60 Hz) of the power generation system 10 under consideration, which maintains the generators 30 and loads 70a-x that are interconnected via the delivery network 60 under consideration.

As such, the model-based filters 140a-c utilizes the mathematical model (1) to generate output values that are processed and analyzed by an estimation component 200 that is executed by the processing system 130. In particular, the output from the model-based filters 140a-c is processed by a construct unit 250 prior to being analyzed by a least squares parameter estimation unit 270 comprising the estimation component 200. Thus, the model-based filters 140a-c and the estimation component 200 are configured to interact with the generation unit 20 in order to estimate several of the parameters defined by the generator model (1) including the parameter $D(x_{rest})$ that identifies the total or aggregate amount of damping that is being provided by the power generation unit 20. In particular, such estimation process is carried out whereby the voltage and current values identified by the measurement unit 100 are processed to determine the parameter $P_{elec}$, which defines the power output by the power generator 30 and allows the determination of the operation frequency or speed (w-ws) of the generator rotor 32. As an alternative to measuring voltage and current output by the power generator 30, the measurement unit 100 may be configured to measure the operating frequency of the power generation unit 20 directly, which, due to the close electrical proximity of the measurement unit 100 to the power generator 30, serves as a sufficient reflection of the speed (w-w$_s$) of the generator rotor 32. Upon the determination of P$_{elec}$ and w-w$_s$, the processing system 130, specifically the dynamic generator model (1), the model-based filters 140a-c and the estimation component 200, are able to identify the variables H and Pm, which leads to the estimation of the variable D(x$_{rest}$) via a least-squares analysis performed by the estimation component 200, which defines the total damping level provided by the power generation unit 20.

By estimating the total damping value D(x$_{rest}$) through the estimation process employed by the multiple, parallel model-based filters 140a-c and the estimation component 200, one can evaluate whether the currently estimated total damping values [D(x$_{rest}$)] vary from previously collected historical total damping values [D(x$_{rest}$)] using various statistical techniques to be discussed. For example, if the current or recent total damping estimates of D(x$_{rest}$) ascertained by the parallel observers or model-based filters 140 are found to deviate from the historical total damping values that have been estimated in the past, then transmission system operators (TSO), such as power delivery utilities, will be prompted that some change relating to the operation of the power system stabilizer (PSS) 80 has occurred. Specifically, a change in the total damping values of D(x$_{rest}$) are indicative of the fact that the PSS 80 associated with the power generator 30 may not have been properly operational or that the PSS 80 has been switched off.

In order to estimate the desired parameters of H, P$_m$, and D(x$_{rest}$), using the model-based estimation system, the model-based filters 140a-c implements the dynamic model (1) of the power generator 30, whereby the variables a$_i$, b$_j$, and m$_k$ are unknown parameters and are in general nonlinear functions of the physical parameters of the dynamical power generation unit 20 under consideration. In particular, the mathematical model (1) defining the power generator 30, which is set forth above, may be implemented in linear form, making it suitable for implementation by the model-based filters 140a-c. As such, in linear form, the equations that implement the generator model (1), utilized by the model-based filters 140a-c to estimate the parameters H, P$_m$, and D(x$_{rest}$) are described by the following:

$$M \frac{dx}{dt} = Ax + Bu$$

and y=Cx, whereby $$A = A_o + \sum_{i=1}^{p} a_i A_i; \quad (2)$$

$$B = B_o + \sum_{j=1}^{q} b_j B_j; \quad (3)$$

and $$M = M_o + \sum_{k=1}^{s} m_k M_k. \quad (4)$$

Furthermore, we define a vector θ=[a' b' m' γ]' by concatenating the vectors a=[ . . . a$_i$ . . . ]', b=[ . . . b$_j$ . . . ]' and m=[ . . . m$_k$ . . . ]', where the scalar γ is defined as a slack variable. Whereby for the present application:

$M=2H, A=-D(x_{rest}), B=P_m-P_{elec}, C=1, x=w-w_s,$
$y=w-w_s,$ furthermore $A_o=0, A_{i=1}=-1, a_{i=1}=D$
$(x_{rest}), B_o=P_{elec}, B_{i=1}=1, b_{i=1}=P_m,$ $$M_o = 1, M_{i=1} = 1, m_{i=1} = 2H - 1,$$

$$\text{whereby vector } \theta = \begin{bmatrix} a_1 \\ b_1 \\ m_1 \\ \gamma \end{bmatrix} = \begin{bmatrix} \theta_{e1} \\ \theta_{e2} \\ \theta_{e3} \\ \theta_{e4} \end{bmatrix}.$$

As such, each model based filter 140a-c is defined by respective elements θ$_{e1-4}$ of θ, which is realized by implementing the following designed dynamical system:

$$M_0 \hat{\dot{x}}_{\theta_e} = A_{\theta_e} \hat{x}_{\theta_e} + B_{\theta_e} u + k_{\theta_e}(y, \hat{y}_{\theta_e}) \quad (5)$$

$$\hat{y}_{\theta_e} = C \hat{x}_{\theta_e}, \quad (6)$$

and $$\hat{y} = \sum_i \theta_{ei} \hat{y}_{\theta_{ei}}. \quad (7)$$

And where each function k$_{\theta_e}$ is designed to force ŷ→y as t→∞, where $$\hat{y} = \sum_i \theta_{ei} \hat{y}_{\theta_{ei}} = \theta' \hat{y}_{\theta_e}.$$

Figure 2:
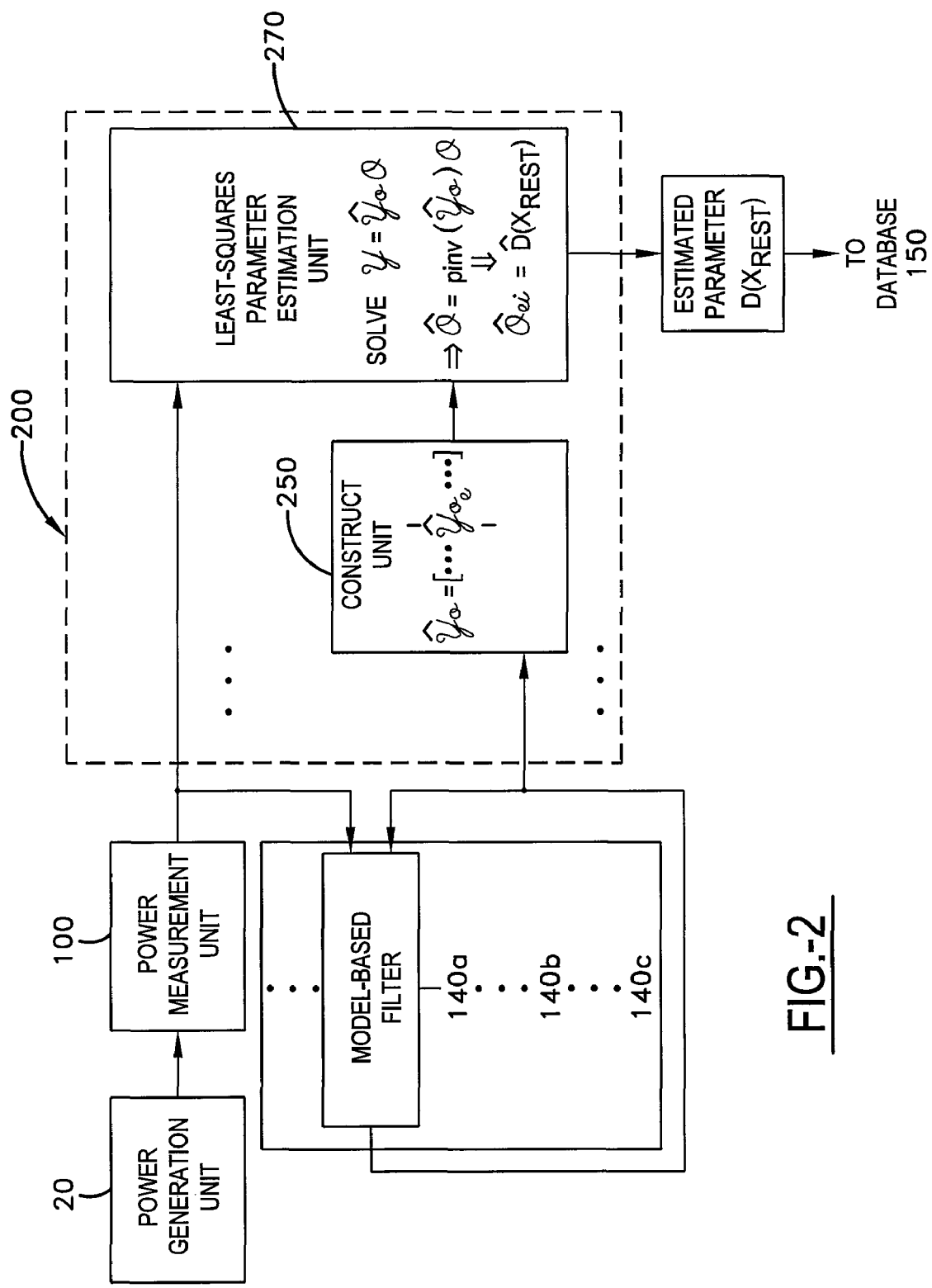
FIG. 2 is a block diagram showing a model-based filter and estimation component utilized by a processing system maintained by the power damping compliance system shown in FIG. 1 in accordance with the concepts of the present invention.

By relying on this converging property (when the unknown parameters are known) for the designed bank of parallel model-based filters 140a-c, a secondary least-squares problem is solved by the estimation unit 270 in order to find the estimates of the unknown parameters. In particular, the estimation unit 270 processes the measurements y and outputs ŷ$_{\theta_e}$ of all the model-based filters 140a-c that have been assembled by the construct unit 250 to form a matrix Ŷ$_\theta$ as input data. Whereby the output of the estimation unit 270 forms the estimates θ$_{e1-4}$ of θ, that are associated with physical parameters of H, Pm, the total damping value D(x$_{rest}$), and the slack variable (γ) as defined in the model power generator model (1). In one aspect, this least-squares estimation process can be done in a recursive manner or by solving the least-square problem associated with a sliding-time window at each time step. Hence, for the present application, identifying the estimate of θ$_{e1}$, which is defined by the matrices, A$_{\theta_{e1}}$=(A$_0$+A$_1$), B$_{\theta_{e1}}$=B$_0$ directly provides us with the estimate of the total damping value D(x$_{rest}$), as shown in FIG. 2.

Although the value of the total amount of damping provided by the power generation unit 20 has been shown to be estimated by parameter estimation using multiple parallel model-based filters 140 and estimation component 200 as set forth above, such should not be construed as limiting, as other methods may be utilized to ascertain the total damping levels provided by the power generation unit 30 indirectly without direct access thereto.

After the present total damping value of $D(x_{rest})$ is estimated by the least-square parameter estimation unit 270, it is then compared via the processing system 130 to the previously collected or historical total damping values $[D(x_{rest})]$ stored in the database 150 using a variety of statistical analysis techniques. In particular, an average value of historical or previously collected total damping values $[D(x_{rest})]$ may be compared to currently estimated total damping $D(x_{rest})$ values. For example, if the currently estimated total damping value $D(x_{rest})$ is less than historical values of $D(x_{rest})$ previously collected, then it can be implied that the power system stabilizers (PSS) 80 used in association with the power generator 30 have been currently deactivated or removed. However, if the currently estimated total damping value $D(x_{rest})$ is greater than historical total damping values of $D(x_{rest})$ previously collected, then it can be suggested that the power system stabilizers (PSS) 80 have been previously deactivated. Moreover, the currently estimated damping values may be compared to an average of any portion of the historical damping values as well. In addition, the currently estimated total damping values may be compared to the standard deviation of the historical total damping values. Alternatively, it should also be appreciated that only the historical total damping values $D(x_{rest})$ may be analyzed as well to identify any particular trends that may be present to identify changes in operation of the PSS 80. That is, the historical damping values $D(x_{rest})$ may be analyzed using various data mining techniques to identify particular trends or patterns in the magnitude of the damping values $D(x_{rest})$ over time. As such, data mining is beneficial to analyze the manner in which the amount of damping $D(x_{rest})$ has changed in relation to a defined point of reference, such as time for example.

In another aspect to statistically compare historical and currently estimated total damping values $D(x_{rest})$, a distribution may be constructed for the estimated parameter in questions so as to obtain an estimated parameter. The estimated parameter value is then compared with the describing parameters of the distribution. For example, if a determination can be made that the newly estimated total damping parameter $D(x_{rest})$ is outside two or three standard deviations of the estimated distribution, then an individual monitoring the power generation system 10 is prompted that either the power system stabilizers 80 have been switched on or off based on the initial status (on or off) of the PSS 80.

In the event that the level of total electromechanical damping provided by the generation unit 20 is determined to be out of compliance, the power delivery utility overseeing the operation of the delivery network 60 can take corrective action by contacting the power generation utility that oversees the operation of the power generation unit 20 or other authoritative body. As previously mentioned, because the power generation utility and the power delivery utility are separate, distinct enterprises, which interact with each other on an arms-length basis, the power delivery utility would not be permitted on the site of the power generation unit 20 to directly determine the level of electromechanical damping that is being provided. However, the compliance system 12 overcomes this obstacle by enabling the power delivery utility to monitor and analyze current electromechanical damping levels remotely via the interface with the power delivery bus 50.

After the statistical analysis has been performed, the processing system 130 may then generate a report 300 that may be graphically presented via suitable display and/or printed. The statistical analysis report may provide various details relating to the comparison of the current total damping levels, with that of the historical damping levels that are stored at the database 150, to facilitate the determination as to whether current levels of electromechanical damping are in compliance with current regulations. In addition, the processing system 130 may be configured whereby the generated report 300 summarizes the historical and/or current total damping values associated with the operation of the power generation unit 30 that have been estimated by the system 12 in any desired manner.

It will, therefore, be appreciated that one advantage of one or more embodiments of the present invention is that a power damping compliance system determines whether a power system stabilizer (PSS) is operating in compliance with predetermined criteria without requiring direct access to the power generation unit. In addition, another advantage of the present invention is that a power damping compliance system obtains real-time estimates of the amount of damping maintained by a power generation unit for statistical comparison with historical or other damping values. Furthermore, another advantage of the present invention is that a system for monitoring power damping compliance of a power generation unit is configured to generate a report that identifies changes in the damping provided by a power generation unit to prevent damage from occurring to a power delivery network and/or the power generation unit.

Although the present invention has been described in considerable detail with reference to certain embodiments, other embodiments are possible. Therefore, the spirit and scope of the appended claims should not be limited to the description of the embodiments contained herein.

What is claimed is:

1. A system for monitoring electromechanical damping compliance of power generated by a power generation unit for supply to a power delivery network, the system comprising:
    a measurement unit adapted to be coupled to the delivery network, said measurement unit configured to identify the voltage and current values output by the power generation unit;
    a database adapted to maintain at least one prior electromechanical damping value associated with the operation of the power generation unit; and
    a processing system coupled to said measurement unit and said database, said processing system maintaining a plurality of parallel model-based filters coupled to an estimation unit, said model-based filters configured to define the operation of the power generation unit based on at least the identified voltage and current values, so as to generate at least one output value processed by said estimation unit to estimate an electromechanical damping value, wherein said processing system compares said estimated electromechanical damping value with said at least one prior electromechanical damping value to determine if said estimated electromechanical damping value varies from said at least one prior electromechanical damping value.

2. The system of claim 1, wherein said measurement unit comprises a phasor measurement unit (PMU).

3. The system of claim 1, wherein said measurement unit comprises a power quality (PQ) meter.

4. The system of claim 1, wherein said processing system is configured to generate a report based on the comparison of said estimated electromechanical damping value with said at least one prior electromechanical damping value.

5. The system of claim 1, further comprising a triggering system coupled to said measurement unit, said triggering system configured to identify if the power output by the power generation unit is persistently excited.

6. The system of claim 5, wherein said processing system compares said estimated electromechanical damping value with said at least one prior electromechanical damping value if said triggering system identifies that the power generation unit is being persistently excited.

7. The system of claim 1, wherein said estimation unit employs a least-squares process to estimate said electromechanical damping value.

8. A system for monitoring electromechanical damping compliance of power generated by a power generation unit for supply to a power delivery network, the system comprising:
a measurement unit adapted to be coupled to the power delivery network, said measurement unit configured to identify the operating frequency associated with the power generated by the power generation unit;
a database adapted to maintain at least one prior electromechanical damping value associated with the operation of the power generation unit; and
a processing system coupled to said measurement unit and said database, said processing system maintaining a plurality of parallel model-based filters coupled to an estimation unit, said model-based filters configured to define the operation of the power generation unit based on at least the identified operating frequency, so as to generate at least one output value processed by said estimation unit to estimate an electromechanical damping value, wherein said processing system compares said estimated electromechanical damping value with said at least one prior electromechanical damping value to determine if said estimated electromechanical damping value varies from said at least one prior electromechanical damping value.

9. The system of claim 8, wherein said measurement unit comprises a phasor measurement unit (PMU).

10. The system of claim 8, wherein said measurement unit comprises a power quality (PQ) meter.

11. The system of claim 8, wherein said processing system is configured to generate a report based on the comparison of said estimated electromechanical damping value with said at least one prior electromechanical damping value.

12. The system of claim 8, further comprising a triggering system coupled to said measurement unit, said triggering system configured to identify if the power output by the power generation unit is persistently excited.

13. The system of claim 12, wherein said processing system compares said estimated electromechanical damping value with said at least one prior electromechanical damping value if said triggering system identifies that the power generation unit is being persistently excited.

14. The system of claim 8, wherein said estimation unit employs a least-squares process to estimate said electromechanical damping value.

15. A method for monitoring electromechanical damping compliance of a power generation unit configured to distribute power to a delivery bus, the method comprising:
providing a measurement unit configured to measure the operating frequency of the power generation unit;
providing a database of at least one prior electromechanical damping value associated with said measurement unit;
coupling said measurement unit to the delivery bus;
measuring the operating frequency of the power generation unit;
generating at least one output value from a plurality of parallel model-based filters that define the operation of the power generation unit based on at least the measured operating frequency;
estimating an electromechanical damping value from the at least one output value; and
comparing said estimated electromechanical damping value with said at least one prior electromechanical damping value.

16. The method of claim 15, further comprising comparing the standard deviation of said at least one prior electromechanical damping value with said estimated electromechanical damping value.

17. The method of claim 15, further comprising comparing the average of said at least one prior electromechanical damping value with said estimated electromechanical damping value.

18. The method of claim 15, further comprising generating a report that compares said estimated electromechanical damping value with said at least one prior electromechanical damping values.

* * * * *